United States Patent
Tunis

(10) Patent No.: US 7,200,973 B2
(45) Date of Patent: Apr. 10, 2007

(54) WIRE REINFORCED THERMOPLASTIC COATING

(76) Inventor: George Tunis, 5711 Waterside Dr., Berlin, MD (US) 21811

( * ) Notice: Subject to any disclaimer, the term of this patent is extended or adjusted under 35 U.S.C. 154(b) by 0 days.

(21) Appl. No.: 10/732,383

(22) Filed: Dec. 10, 2003

(65) Prior Publication Data

US 2004/0121137 A1    Jun. 24, 2004

Related U.S. Application Data

(62) Division of application No. 09/947,681, filed on Sep. 5, 2001, now Pat. No. 7,144,625.

(60) Provisional application No. 60/230,483, filed on Sep. 6, 2000.

(51) Int. Cl.
E04C 3/30 (2006.01)
B32B 3/00 (2006.01)
B32B 3/14 (2006.01)
D02G 3/00 (2006.01)

(52) U.S. Cl. ............... 52/720.1; 52/165; 52/252; 52/721; 52/745.09; 416/417; 138/175; 405/150.1; 405/158; 405/231; 114/143; 114/144 R; 114/162; 114/169; 114/345; 248/156; 428/297.7

(58) Field of Classification Search ............... 428/357, 428/361, 365, 370, 389, 396, 401, 294.7, 428/375, 116, 188, 229; 442/229; 52/592.1, 52/576, 165, 252, 720.1, 721, 745.09; 416/417; 248/156; 405/150.1, 158, 231; 138/175; 249/48, 120; 114/127, 183, 45, 55.5, 6, 3, 114/169, 43
See application file for complete search history.

(56) References Cited

U.S. PATENT DOCUMENTS

| | | | | | |
|---|---|---|---|---|---|
| 3,857,217 | A | * | 12/1974 | Reps | 52/592.1 |
| 4,016,232 | A | | 4/1977 | Pringle | 264/112 |
| 4,019,301 | A | | 4/1977 | Fox | 52/721.4 |
| 4,081,148 | A | * | 3/1978 | Murphy | 245/5 |
| 4,121,855 | A | * | 10/1978 | Mortenson | 280/654 |
| 4,234,648 | A | * | 11/1980 | Patz et al. | 442/229 |
| 4,316,925 | A | * | 2/1982 | Delmonte | 428/105 |
| 4,364,993 | A | | 12/1982 | Edelman et al. | 428/298.7 |
| 4,683,689 | A | * | 8/1987 | Loggy | 52/80.1 |
| 4,880,584 | A | | 11/1989 | Jones et al. | 264/135 |
| 4,897,286 | A | | 1/1990 | Kosuda et al. | 427/594 |
| 4,957,801 | A | | 9/1990 | Maranci et al. | 428/147 |

(Continued)

FOREIGN PATENT DOCUMENTS

DE    198 35 075    2/2000

(Continued)

Primary Examiner—Rena Dye
Assistant Examiner—Camie S. Thompson
(74) Attorney, Agent, or Firm—Weingarten, Schurgin, Gagnebin & Lebovici LLP

(57) ABSTRACT

A structural reinforcing layer made from wire, a structural reinforcing composite layer made from wire, and the resulting load bearing structures made from or retrofitted with wire reinforced plastics and cements. Said layers and structures made from monofilament metallic or pre-cured composite materials twisted into multi-strand wire geometry optimized to mechanically shear load into rigid thermoplastic, thermoset, metallic or cementious resin systems. Wire geometry, count, size and strength/stiffness can be varied in combination with resin type, sheet structure, permeability and orientation to create layers intended for use in composite and cement based structures as originally molded reinforcement or retrofitted structural upgrades.

9 Claims, 16 Drawing Sheets

U.S. PATENT DOCUMENTS

| | | | | |
|---|---|---|---|---|
| 5,277,479 A | * | 1/1994 | Koyama et al. | 301/64.703 |
| 5,316,834 A | * | 5/1994 | Matsuda et al. | 442/247 |
| 5,519,094 A | | 5/1996 | Tseng et al. | 525/440 |
| 5,633,074 A | | 5/1997 | Muroi et al. | 428/213 |
| 5,639,807 A | | 6/1997 | Secrist et al. | 523/215 |
| 5,648,137 A | | 7/1997 | Blackmore | 428/102 |
| 5,750,616 A | | 5/1998 | Shimpuku et al. | 524/496 |
| 5,788,908 A | | 8/1998 | Murakami | 264/136 |
| 6,042,765 A | | 3/2000 | Sugahara et al. | 264/46.1 |
| 6,043,313 A | | 3/2000 | Brink et al. | 524/589 |
| 6,060,163 A | * | 5/2000 | Naaman | 428/397 |
| 6,093,359 A | | 7/2000 | Gauchel et al. | 264/257 |
| 6,103,155 A | | 8/2000 | Uchida et al. | 264/87 |
| 6,106,944 A | | 8/2000 | Heikkila et al. | 428/397 |
| 6,123,882 A | | 9/2000 | Uchida et al. | 264/87 |
| 6,277,771 B1 | * | 8/2001 | Nishimura et al. | 442/229 |
| 6,811,877 B2 | * | 11/2004 | Haislet et al. | 428/377 |
| 2002/0037409 A1 | * | 3/2002 | Tunis | 428/375 |

FOREIGN PATENT DOCUMENTS

| | | |
|---|---|---|
| FR | 1473849 | 3/1967 |
| JP | 2001-123579 * | 5/2001 |
| JP | 2001123579 | 5/2001 |
| WO | WO 01/74552 | 10/2001 |

* cited by examiner

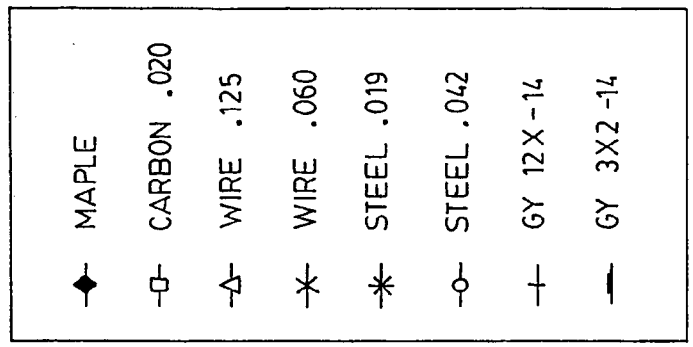
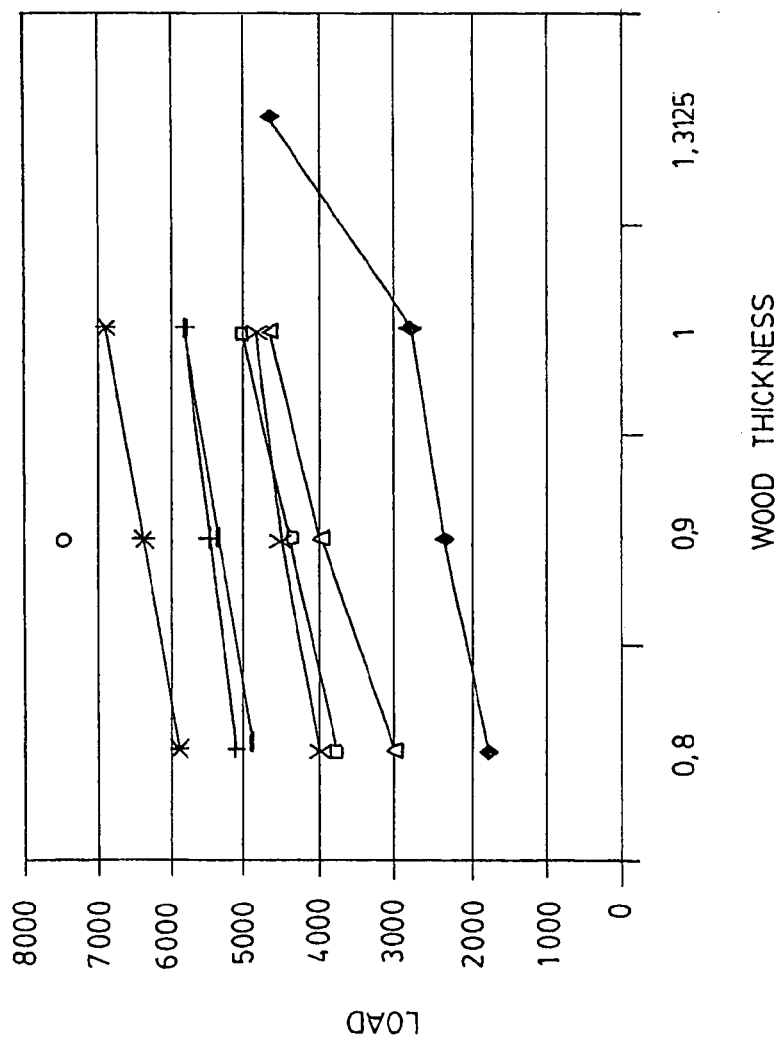
FIG. 14

WIRE REINFORCED THERMOPLASTIC COATING

This application is a divisional of application Ser. No. 09/947,681, filed Sep. 5, 2001 now U.S. Pat. No. 7,144,625, which claims the benefit of provisional application Ser. No. 60/230,483, filed Sep. 6, 2000, which applications are incorporated herein by reference.

FIELD OF THE INVENTION

The invention relates to the use of wire to create reinforcing layers that are intended to be molded into composite materials or used as is to reinforce or retrofit load bearing structures. Further, the invention covers the structures that result from the use of such wire reinforced layers. Throughout, wire is defined as twisted, multi-strand pre-cured composite or metallic monofilaments, twisted together to create geometry optimized to shear load into rigid thermoplastics, thermoset, metallic and cementious resin systems.

DESCRIPTION OF THE PRIOR ART

Traditionally, composite materials, thermoplastic or thermoset based, have been reinforced with fiberglass, aramid, carbon fiber, or other fine diameter, synthetic, man-made fibers. The resulting composite materials are strong, stiff, but expensive and difficult to process. Similarly, large diameter, low strength, steel rebar or steel grids have been used to reinforce thick section concrete structures. The resulting concrete structures are inexpensive, yet do have the strength or weight attributes of their more expensive composite counter parts. From a different perspective, steel wire has been used exclusively to reinforce flexible rubber to make products that are strong, but are flexible and therefore limited in their applications.

SUMMARY OF THE INVENTION

It is an object of the present invention to provide a composite wire reinforced structure which uses wire, made from steel, brass coated steel, other metallic wires or pre-cured composite material, in rigid thermoplastic, thermoset, and cementious resin systems. The wire reinforced structure of the present invention is both structurally efficient and economical to produce. In accordance with the invention, this object is achieved with a structural reinforcing layer for use in composite materials for carrying load and providing structural stiffness, comprising a wire layer arranged to create a twisted wire geometry which is mechanically interlocked into a structural matrix material.

DESCRIPTION OF THE DRAWINGS

The present invention will be better understood after reading a description of preferred embodiments thereof, made with reference to the following drawings in which:

FIG. 14 is a graph of the strength of a truck floor in a three point off center bend test for a variety of materials, as a function of wood thickness.

DESCRIPTION OF A PREFERRED EMBODIMENT OF THE INVENTION

Figure 1:
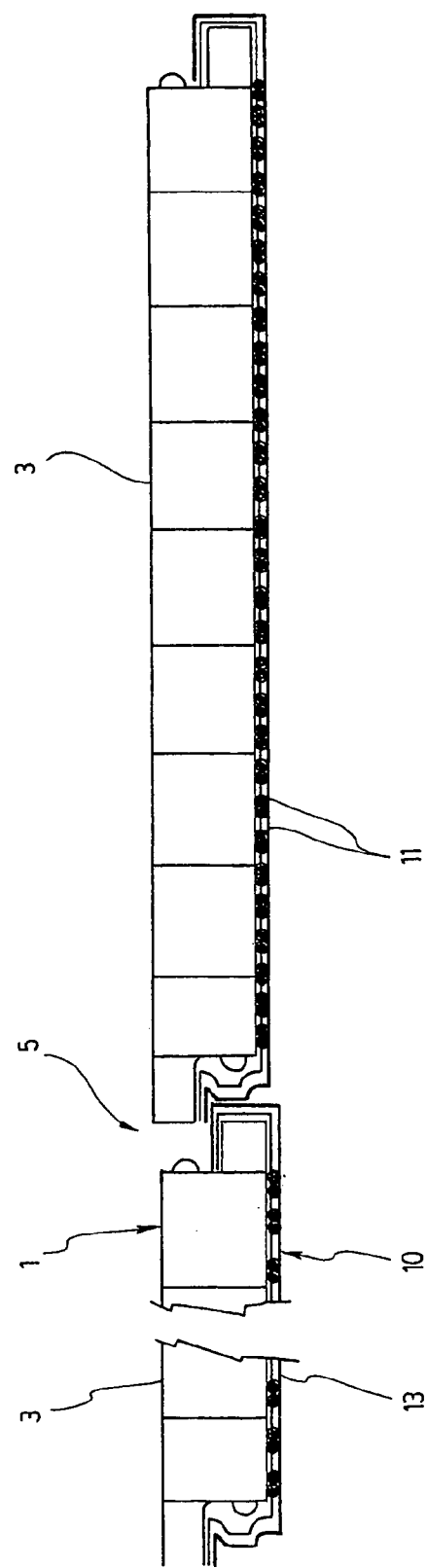
FIG. 1 is a cross-sectional view of a truck floor reinforced with a structural reinforcing layer according to a preferred embodiment of the invention.

Referring now to the accompanying drawings, the present invention is best described as a twisted wire structure that is further arranged into a sheet with a structural matrix material that can be molded into or attached to an element to make the element stronger and stiffer.

The present invention uses wire, made from steel, brass coated steel, other metallic wire or pre-cured composite material, in rigid thermoplastic, thermoset, and cementitious resins systems (the structural matrix) to create composite reinforced structures that are both structurally efficient and economical to produce. Steel wire, used in the past to reinforce flexible rubber, has the advantage of high strength, very high stiffness, and exceptionally low cost, but as a reinforcement for rubber, its use has been limited to strength dominated, flexible applications. Further, steel wire offers the advantage of having a "macrostructure" that allows for the optimal shearing of load into low or high viscosity matrix resins. (This "macrostructure" would be present in all embodiments of the invention, if steel, brass coated steel, metallic or pre-cured composite where twisted together to form the wire as described.) In the past, these properties have only been put to use for the reinforcement of rubber, such as tires, hose, or conveyor belting. The result of the present invention has numerous applications in the replacement of fiberglass, carbon, low strength steel, and aramid fiber in composite construction, cement based construction and retrofit, and structural plastics.

The use of wire, and specifically steel wire, over traditional reinforcements as a primary reinforcement is especially attractive in several areas.

First, in large structures, structural stiffness many times drives the design of the structure. An example would be a wind blade or bridge deck, where structural deflection, not strength is the primary design driver. In theses cases, the economical stiffness of steel (30 msi) shows a clear advantage over fiberglass (6 msi) or carbon fiber (19 msi) composite. Plastics reinforced with steel wire, designed for stiffness, are lighter, more cost effective and thinner than those designed with fiberglass reinforced plastic. Since the resulting structure is thinner, and since wire reinforced fabrics or knits can be made into very thick individual layers, labor is also reduced during assembly of these structures. Compared to carbon fiber reinforced plastics, steel wire reinforced plastics are substantially less expensive. Additionally, no special resin system is required for use with wire-reinforced plastics, as is required for carbon fiber composites (carbon requires the use of epoxy resins to achieve the full properties of the fibers). Additionally, due to the gross macrostructure of the wire reinforcement, filled resin systems can also be used, further reducing the cost, and adding the benefit of reduced exotherms during cure.

Second, this gross macrostructure, as compared to the extremely fine diameter of fiberglass or even finer diameter of carbon or aramid fiber, greatly enhances the processability of steel wire reinforced composites. Comparing the use of relatively low viscosity thermoset resin systems, steel wire reinforced composites are faster to wet out or can be wet out in extremely thick sections, as compared to traditional reinforcements. In the specific case where vacuum assisted resin transfer molding (VARTM) or resin transfer molding (RTM) is used, steel wire (or other wire) reinforcement has the added benefit of the ability to act as an integral resin distribution layer, effectively aiding in the movement of resin to the most critical load bearing points.

The ideal format for the individual wire elements is two or more monofilaments twisted together to form a resulting wire that will create a mechanical interlock with a structural matrix. Advantageously, the wire will either consist of several small wires wrapped by one wire or will consist of three or more filaments twisted together to make an asymmetrical twisted wire that is easy to wet through and forms a screw-like mechanical lock with the structural matrix systems.

Figure 2:
FIG. 2 shows a steel wire structure according to a preferred embodiment of the invention.
Figure 3:
FIG. 3 shows a steel wire structure according to an alternative embodiment.

The twisted format for the wire is best shown in FIGS. 2 and 3. In FIG. 2, the twisted wire is made by twisting one wire at a short lay length around 12 wires that are twisted at a longer lay length.

The structure contains many (usually 9 to 30) small wire filaments (0.006") wrapped by one small wire filament (0.006"). The wrap wire functions to hold the wire bundle together when cut and to shear load into the wire bundle when impregnated or laminated to a rigid matrix. During tensile loading, the wrap wire will tighten on the bundle, helping all the wires share equally in the load. In compression, the wrap wire helps the wires to act as one cord and greatly increase the buckling load of the individual filaments. When molded into a rigid matrix, the wrap wire greatly reduces the development length of the wire cord (the length the wire cord needs to be held in the matrix to reach the breaking strength of the wire cord). If single filaments of wire are used instead of the cord, even the strongest resin (epoxy) will not hold the wire enough to reach the breaking strength of the filaments without first delaminating. With the wrap wire, only 1" of length is required to reach the break strength of the entire cord (13 filaments in the test case resulting in approximately 350 lbs of load).

In FIG. 3, the wire structure is made from simply twisting more than 2 single filaments together. Most effective geometries in this case are usually uneven, asymmetric geometries such as 2 wires twisted by 3 wires. However, even 2 wires simply twisted together will suffice to create an interlocking geometry. The resulting structure is preferably open to allow for the penetration of matrix material around and through the cord bundle. The twisted geometry of the cord facilitates a screw like mechanical lock into the rigid matrix, resulting in efficient load transfer between the filaments of the cord, between individual cords and between the cords and the structure being reinforced. The development length for this type of geometry is slightly longer than the wrapped construction detailed (10 to 15% longer development length).

Regarding both systems, it was shown during testing that both methods of achieving the mechanical lock to the matrix was effective at short development lengths, typically 1" or less for both high adhesion or low adhesion matrix systems, resulting in wire failure before pull out was achieved. There are endless possibilities to permutations to the wire geometries and materials possible; however, they are always characterized by two or more monofilaments of metallic or pre-cured composite twisted together to make a geometry that will become mechanically locked in a rigid matrix. When the materials contemplated are used in a layered format, where adhered lengths are long as compared to the required development lengths, performance of the wire composite structures are highly efficient and extremely predictable.

In a preferred embodiment of the invention, the format for the wire layer made from the above-described wires is a knitted, woven, or scrim/glue assembled layer, layers, or multi ply format that effectively holds a number of wires together in a tape format of various widths. The tape can then be assembled into composite or cementious products in one or more layers, where the resin or cement acts to glue the layers together and, in some cases, to the other parts of the structure. It will be appreciated by a person skilled in the art that the tape is inexpensive to produce, can be easily be slit to custom widths, and can survive the stress of cross cutting without coming apart. The tape can be wet out with resin or cement by hand, impregnation machine or other "wet technique", or dry fabric assemblies can be made and subsequently infused with resin through various closed mold techniques such as resin transfer molding, vacuum assisted resin transfer molding, resin infusion, resin film infusion, injection molding or other like closed mold technique.

Figure 4:
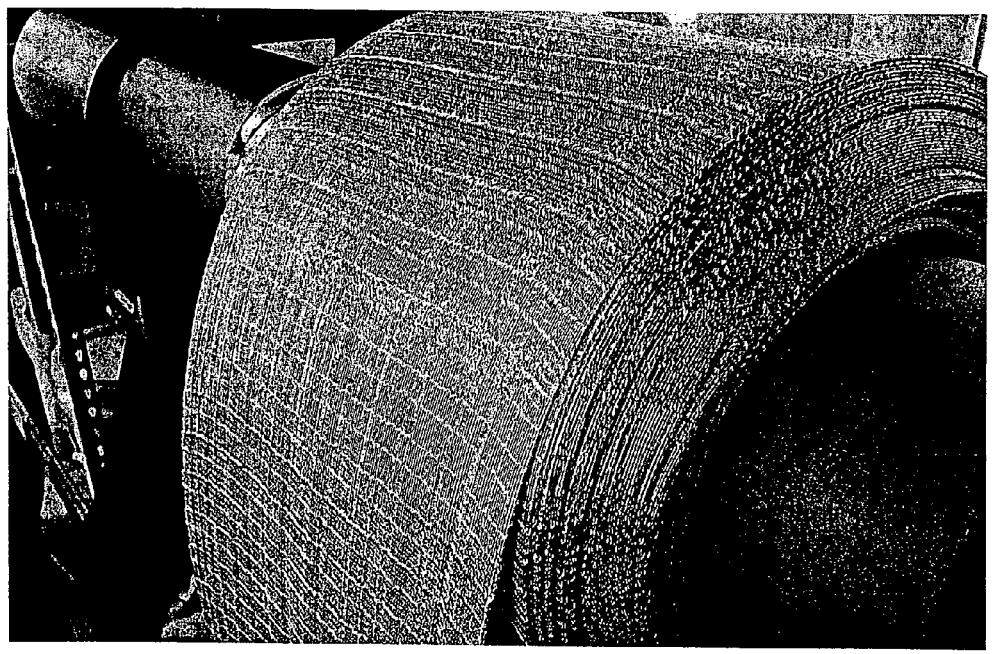
FIG. 4 shows a wire warp knitted together with polyester thread as supplied on a roll.

Referring to FIG. 4, there is shown the polyester knitted material as supplied on a roll. The roll is 50 yards long and 12" wide. The material density can be stretched from 16 wires/inch to a lower density of 10 wires/inch. This is the size roll that would be required for a single layer of a typical wind blade from root to blade tip. In a blade between 6 and 12 layers of this material would be required for the lamination. The molding process could be hand lamination, machine lamination or vacuum assisted resin transfer molding. The 6 to 12 layers would replace over 50 layers of typical unidirectional fiberglass. One layer of this material is used, soaked in epoxy, to reinforce a truck floor or as a typical retrofit for a bridge or building beam. During the knitting process the material can made very wide, in excess of 100", and individual rolls can be made in multiples of this machine width by knitting individual panels. The knitted material has the unique attribute that it can be slit after it is made and wires do not "fall off" the edge, but remain tied in to the knitted structure.

Figure 5:
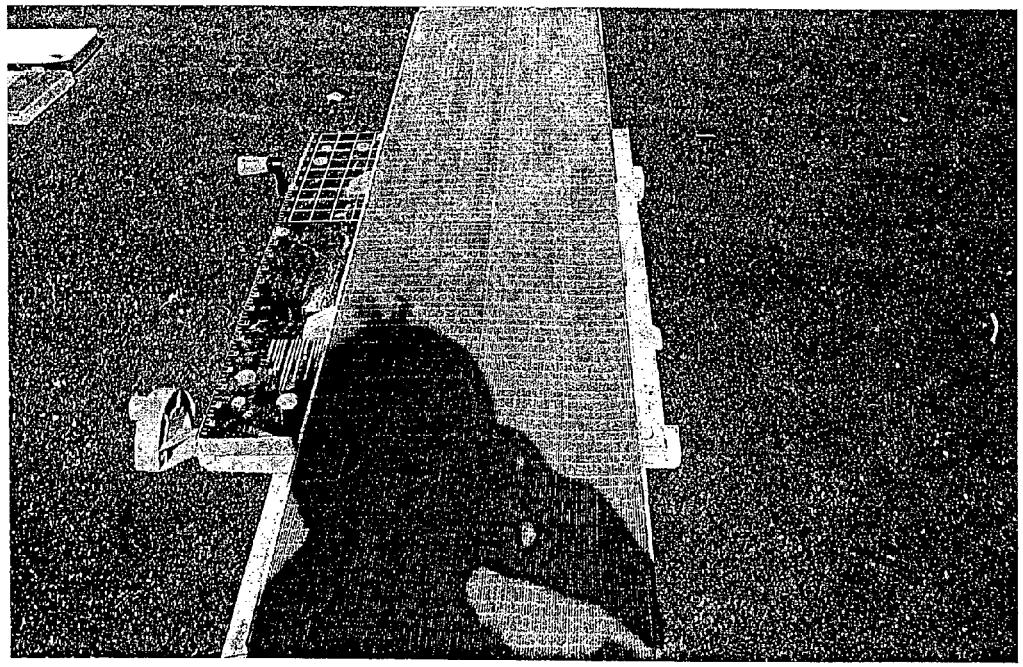
FIG. 5 shows the wire-polyester knit once it has been wet with resin applied to a truck floor.

FIG. 5 shows the wire-polyester knit once it has been wet with resin. In this case the material was applied to the floor dry and resin was rolled onto the knitted cord and allowed to soak in and subsequently cure. The resulting laminate did not trap air (voids) and could be re-coated to build additional thickness if required. Note that typical composite laminations require excessive work to remove air from the laminates and they cannot be re-coated after resin cure, since typically they "skin over" making further impregnation impossible. The gross "macrostructure" of the cord makes the wet out process simple, fast and mistake proof.

Figure 6:
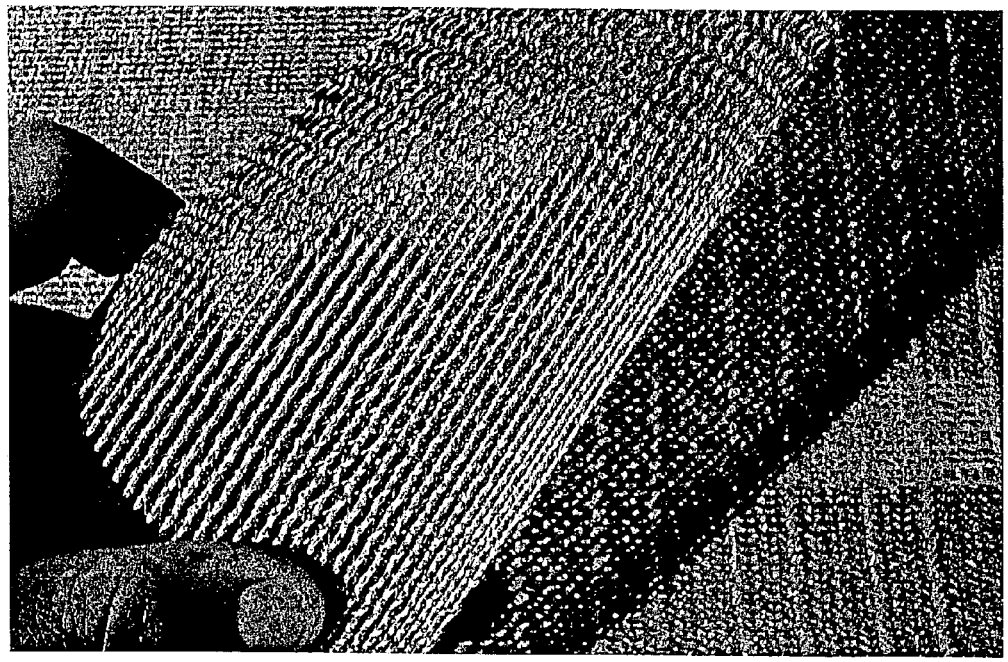
FIG. 6 shows an alternative embodiment of the preferred knit construction where the wire warp has been knitted together with a combination of copper and polyester knit threads.

FIG. 6 shows an alternative embodiment. In this case one knit yarn is polyester (used to spiral the structural cords) and the second wire is metallic copper. The copper wire (0.006") is used to cross back and forth between structural cords, and is tied to the structural cords by the spiraling polyester knit thread. The copper is used to create a knitted fabric that maintains precise cord spacing and is uniformly electrically conductive. The resulting "boardy" fabric maintains perfect alignment, even when roughly handled, and maintains precise wire spacing. Testing has shown that when comparably low adhesion strength cementious matrix materials are used, cord spacing must be maintained at a level of 14 wire/inch or less to achieve minimum pop off strength test results (minimum of 200 psi). The copper also serves a second important role. To protect the wire long term from any corrosion, the cord-reinforcing layer can be easily wired to a zinc anode to provide galvanic protection. Because the copper provides uniform electrical conductivity between all the cord elements, the entire structure can be easily protected with only one complete electrical connection to the zinc anode.

Figure 7:
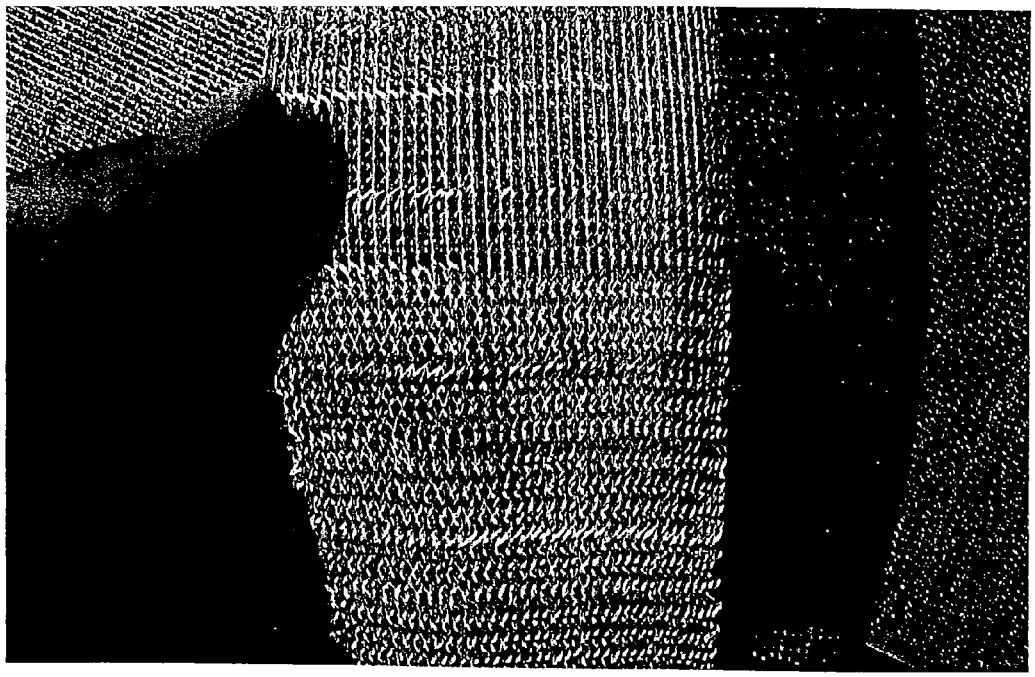
FIG. 7 shows the individual wire structures that are held together by two knit yarns made from polyester.

FIG. 7 shows the individual wire structures that are held together by two knit yarns made from polyester (or any suitable knitting yarn or monofilament). The knitting process provides for a way to organize the wire warp, control its spacing and create an easy to use reinforcing layer. We used two "bars" of knit yarn to tie the wires together and make the fabric easy to cut. One or more knit yarns is necessary in addition to the warp of cord to make the fabric. Of note, the addition of the second knit yarn greatly reduced the tendency of the fabric to run (like stockings) when cut. The polyester yarn is effective in helping to hold resin in the fabric when hand laminated, and it provides some level of transverse reinforcement. One can see the chain stitch that spiral around the cords and the crossovers that cross between cord structures. Note that the knit holds the wires very straight in relation to each other. The amount of knit thread, construction and tension can be varied to change the number of cords/inch. The preferred embodiment shows 12 to 14 wires/inch of a 0.05" cord. The resulting layer has 3.3 kps/inch of strength. This type of material is perfect for single layer laminations, multiple layer laminations, vacuum assisted rtm applications, hand laminations, concrete retrofit, all types of molding applications, truck floor reinforcement, etc.

In general, if the wires are to be knitted, woven, or glued together, the construction techniques and materials can be optimized for layer conformability, individual layer strength, layer stiffness, process-ability, wire count or a combination thereof. Furthermore, it will be appreciated that the wires can be continuous or discontinuous, unidirectional or multi-directional. Auxiliary threads used in some of the tape making process can be mono-filament, or multi-filament, as mentioned above. If tapes are made using the wire warps, the tapes can be made by gluing the wire warp to a backing sheet or scrim, or they can be made by simultaneously gluing the wires and creating the backing scrim using spiral spraying, fiberization or other known hot melt gluing application technology.

Figure 8:
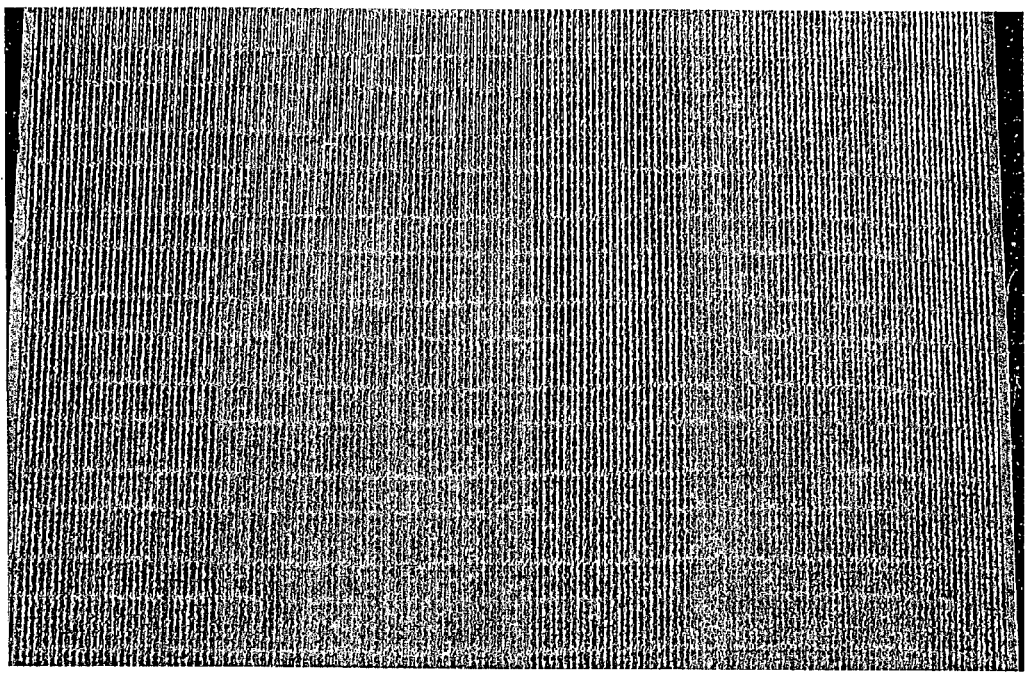
FIG. 8 again shows the knitted cord structure wet out with resin on a truck floor.

FIG. 8 again shows the knitted cord structure wet out with resin on a truck floor. Note that the epoxy use to wet out the cord reinforced layer makes a bumpy layer, thus minimizing the amount of resin used (and the associated cost and weight). It can be seen that if additional layers were necessary, they would nest within the bumps of the previous layer, making for composites of maximum density and high resulting material properties. Note the extra bump associated with the wrap wire of the cord structure. When multiple layers of material are nested tightly together, the wrap wires physically intermesh, allowing for the direct interaction of multiple cords to facilitate even and efficient load sharing, lowering shear requirements for the matrix resin. This picture shows the use of a clear resin, however, for long term environmental resistance, additional layers of resin, paint or thermoplastic can be added to supply additional protection for the wire.

Figure 9:
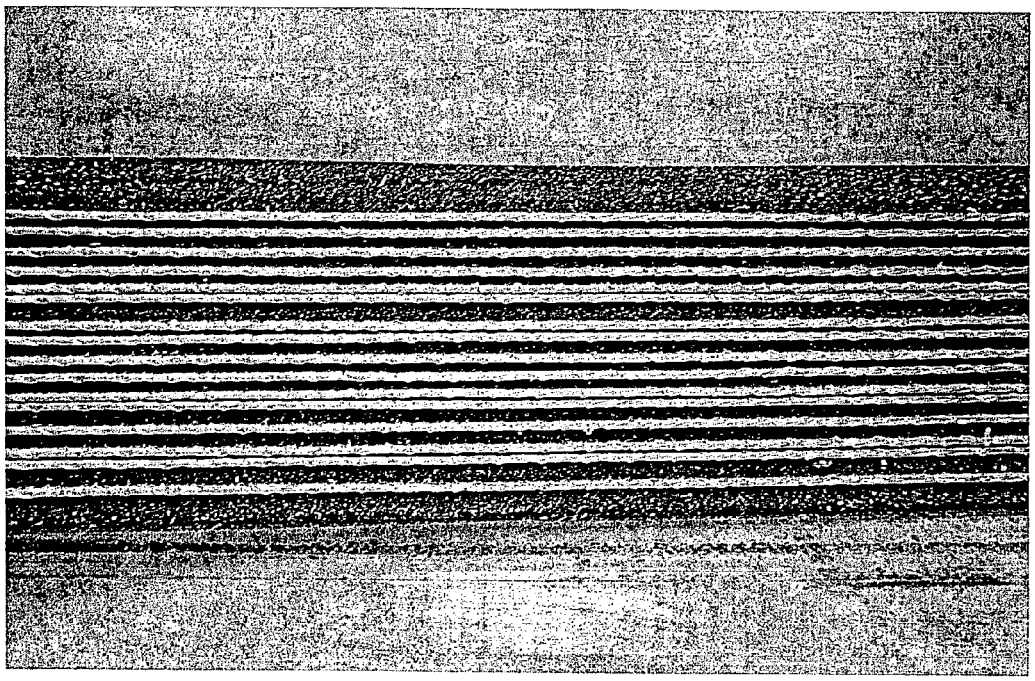
FIG. 9 shows the tape before it is molded onto a structure.
Figure 10:
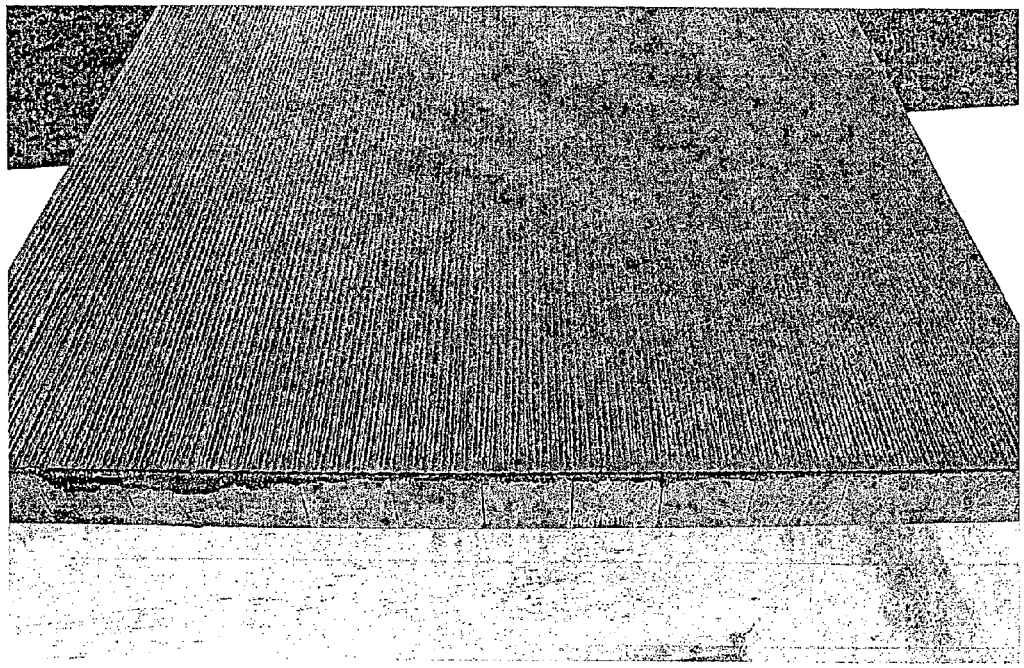
FIG. 10 shows a truck floor reinforced with a wire layer.

FIG. 9 shows the tape before it is molded onto a structure. One can take this material, cap it with another layer of plastic, consolidate it under pressure and make a cord reinforced thermoplastic or one can use this one sided product for use on a structure like a truck floor.

Figure 11:
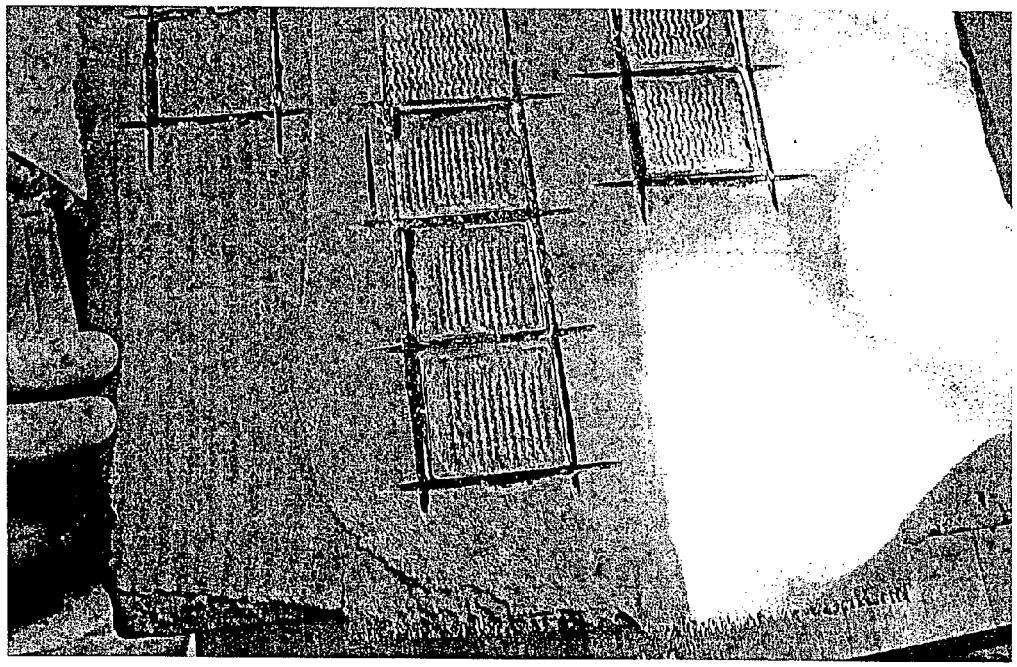
FIG. 11 shows the pop-off test, but where the matrix used is cementious, polymer modified portland cement.
Figure 12:
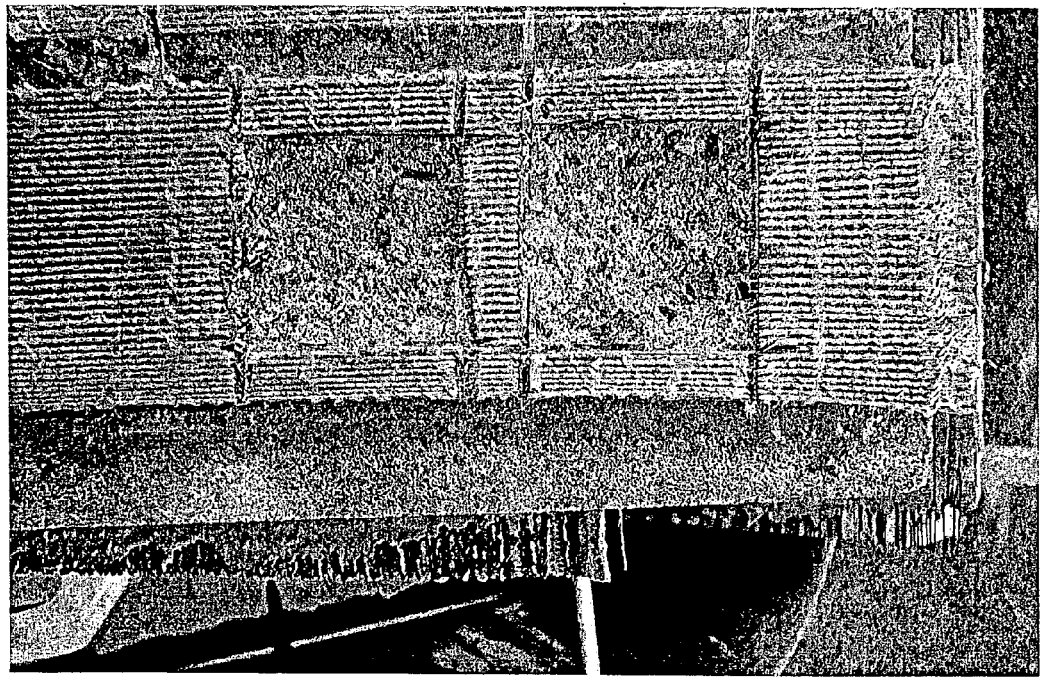
FIG. 12 shows the results from an epoxy pop-off test.
Figure 13:
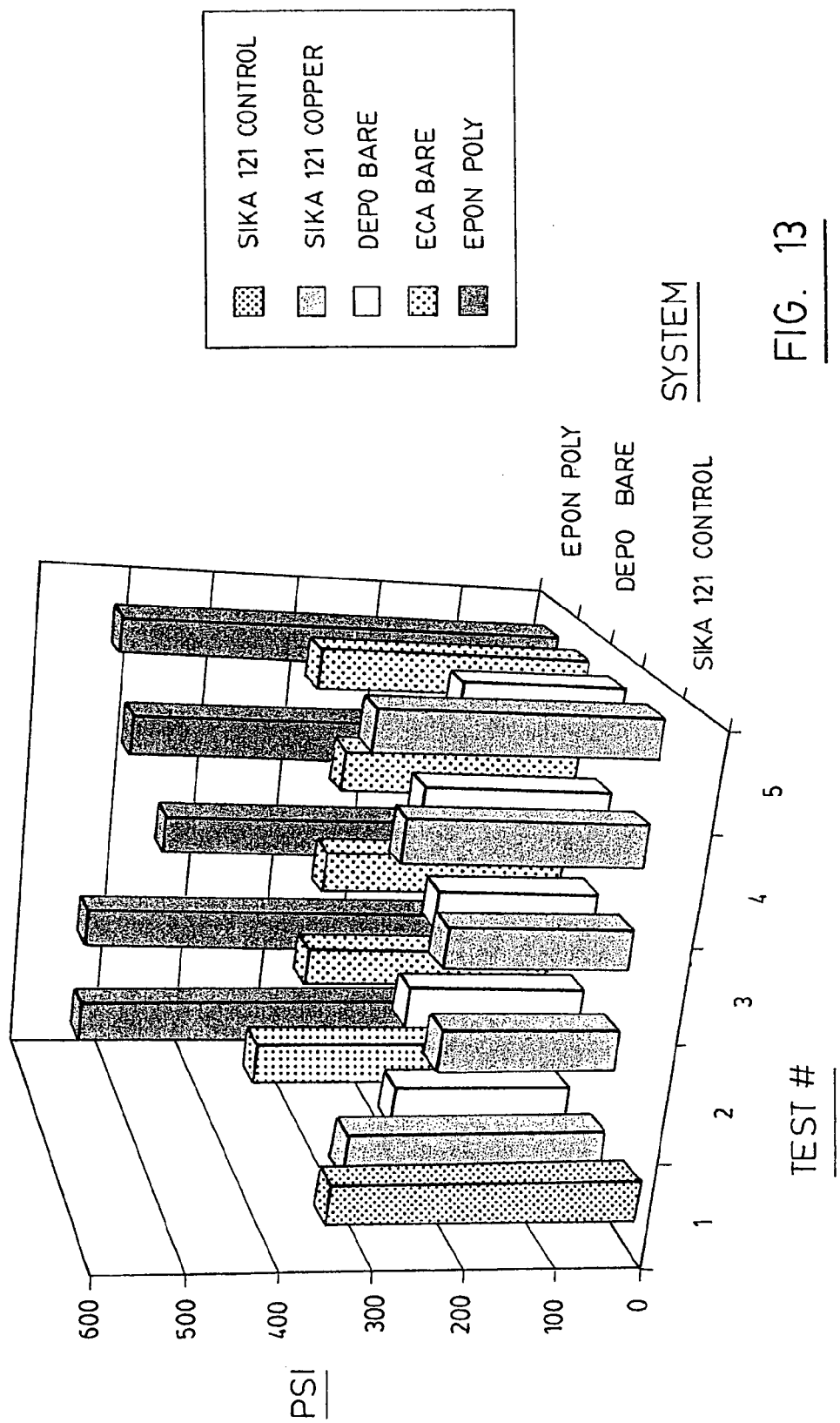
FIG. 13 is a graph showing the results of pop-off tests.

Referring now to FIGS. 11 to 13, there is shown the results of pop-off tests using the teachings of the present invention.

In FIG. 12, the test simply glues a threaded square of metal to the laminate and pulls perpendicular to the cord structure. An ideal test shows failure of the substrate, less than ideal results will show failures of the cord matrix interface. This picture shows ideal failure of the substrate well below the wire layer. The failure value for this test was 500 psi. The test was run on concrete, but we would look for the same type of results if we ran the test on a truck floor or other structure.

In FIG. 11, the results show the failure at the wire matrix interface. The results were about 250 psi. We found that if we put more than 14 wires/inch in the tests, that we would get very low breaks (less than 200 psi).

FIG. 13 shows the results of the pop-off tests performed. A pop-off test is performed in the following manner. A sample is constructed and laminated to a surface to be repaired or strengthened, in order to measure the perpendicular adhesion strength of the matrix. A 0.5" thick, 1.5"× 1.5" threaded steel square is glued to the surface of the sample to be tested. A cut is made around the bonded steel square that extends through the reinforcing layer and into the substrate. A threaded rod is screwed into the steel square and a puller device is attached thereto. The puller is activated and a reading at failure is taken. Failure can occur deep in the substrate (which is the best), at the substrate/matrix interface or within the reinforced layer at the wire-matrix interface.

The graph gives the following information. 1) Sika 121 control is data from a product, Sika 121 latex modified cement, applied to concrete only. There is no wire reinforcing layer included in the lay-up. This data point shows the adhesion strength of this product to the concrete substrate without the addition of the wire cord layer. 2) Sika 121 copper shows the data from the tests where Sika 121 is applied to a wire layer. The wire layer is tied together with a copper wire and a polyester knit yarn. The data is less than the control data, but the failure loads are still acceptable for the application. 3) Depot bare shows data from a test where unknitted bare wire cord has been laminated with a premium tile adhesive. The data was shown to be not strong enough for the intended application. 4) ECA bare shows data from a test where unknitted bare wire cord has been laminated with a filled epoxy resin system. The results were good for this product, showing failure deep in the virgin concrete substrate. 5) Epon poly shows data from a test where polyester knitted wire fabric has been laminated with an unfilled low viscosity epoxy resin. The data for this product was the best showing pure substrate failure. The key difference between the bare wire tests and the knitted tests are to show that there is not a detrimental effect from the inclusion of the knit yarn. The tests actually showed that the inclusion of the knit yarn can help the adhesion by trapping a resin rich layer right at the substrate/wire layer interface.

Figure 15:
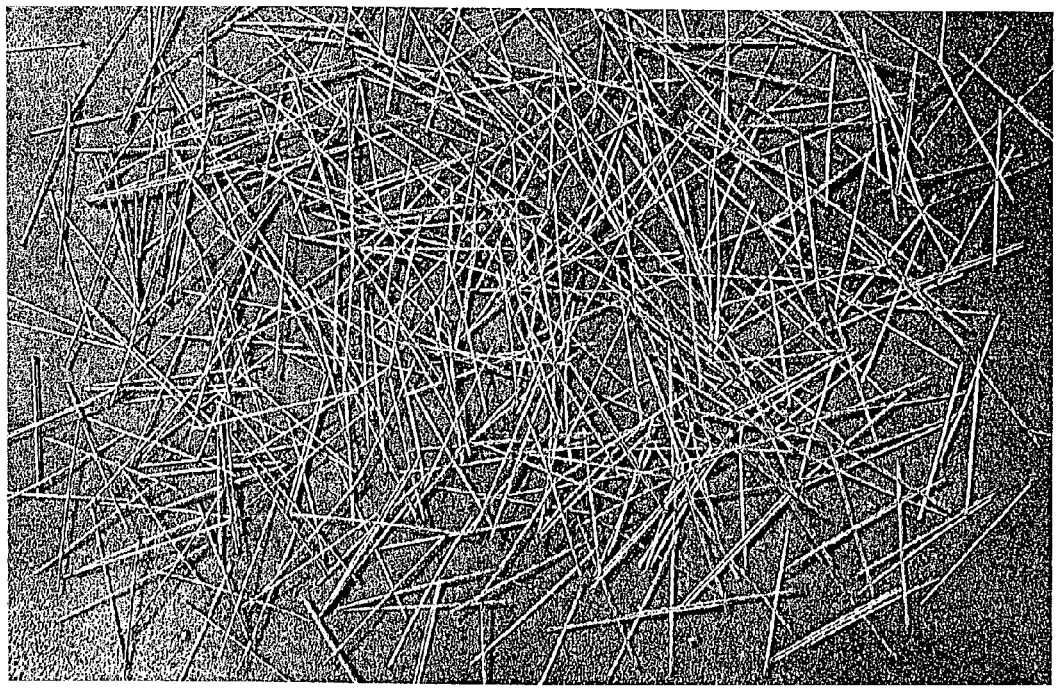
FIGS. 15 and 16 are, respectively, of a mat made from 1" cut wires glued together with a hot-melt glue binder and a mat made from continuously swirled wire glued to a hot-melt binder.
Figure 16:
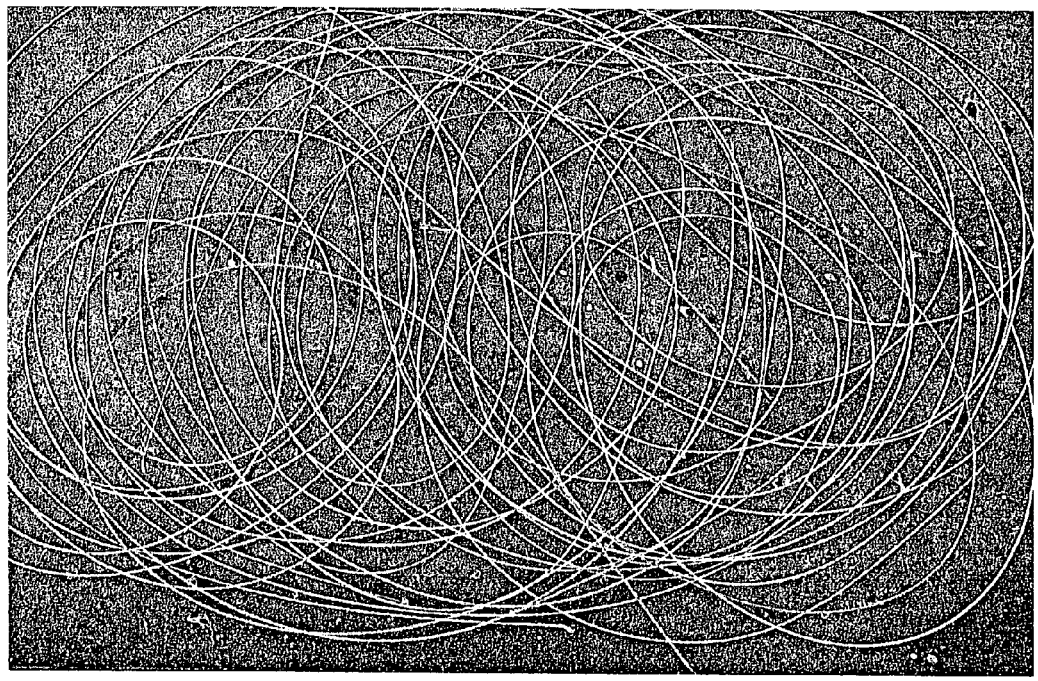

A further object of the invention is to provide for an effective layer to be used in manufacturing structural parts from the novel twisted wire composites. The invention is embodied in several formats, where wires, arranged essentially in a parallel configuration, are held in place to create permeable or impermeable sheets, depending on the end use application. Further these layers can be plied together in both forms of the product to make multi directional reinforcement intended to counteract multi-axial states of stress in some applications. However, multidirectional reinforcement can also be achieved by randomly orienting the wires described herein in either continuous swirl patterns or randomly oriented cut lengths. This random continuous wire mat or chopped wire mat would have slightly lower properties than multi-axially oriented wire warps, but may offer excellent process-ability or superior economics in the final articles. All principles, descriptions and claims describing essentially parallel wire warps would apply to these random products as well. These products are shown in FIGS. 15 and 16.

In the permeable format, the wires are held together in one of several ways to make a tape that can then be molded into structural parts using any number of thermoset, thermoplastic or cementious processes. The tape in one embodiment is unidirectional, but can be plied together to make multidirectional material. In an aspect of the invention, a knitting process is used to take a warp of reinforcing wire and then knit the warp together at a specific spacing with one or more bars of knitting yarn. The knitting yarn type, number and construction can be varied to optimize adhesion to various resin systems, change the material density, change the material "hand", or add cross warp conductivity to the material. Both synthetic yarns and metallic yarns have been tested and characterized for specific and unique attributes in these regards. Specific to uses where cross warp conductivity is optimized, installed material can be wired to galvanic protection systems for long term environmental resistance.

Similarly, the permeable tape can be made using a weaving process or a gluing process where the warp of reinforcing yarn is either woven with a weft of flexible yarn or glued to a scrim or tape product. The woven material can further be dipped in a plastic solution to assist in stabilizing the structure. In the case where a backing scrim is used and the warp is glued, the scrim can be sized to provide an effective screed for use in hand lay-up or can be sized to provide some level of reinforcement transverse to the warp. Where a tape is used to hold the warp in place, the tape can either be a continuous piece of plastic or paper film that can be left in place once the material has been applied to the end structural component, or it can be die cut to form a continuous film filled with holes that are designed to let matrix material through to form "button hole" bonding sites. Further, the tape can be made of such a material to dissolve into the end use matrix material. An example of this dissolvable backing would be where the tape film is made of acrylic or polystyrene material. When either of these backing films is used in conjunction with a styrene based resin, such as polyester or vinylester, the backing tape would dissolve into the composite matrix resin with no adverse effects on flex strength or inter-laminar shear strength. Further to the process of gluing the wire warps together, the warp can be simultaneously glued together and the backing can be created using spiral spray or other equivalent hot melt adhesive application technology.

Permeable layers as described above are used both in retrofit and molding operations. In retrofit applications, layers can be applied to structures to give added stiffness, strength or combinations of attributes. In molded parts, layers can be applied to structural parts to create composites that posses unique structural characteristics and low cost. The preferred embodiments of the permeable layer not only have attractive engineering properties, but also have unique and very desirable processing advantages, such as quick wet out, efficient material lay down and unique resin transfer properties.

Preferably, the resins for use with a tape of this type are thermosets (such as polyester, vinylester, epoxy or other like resin), thermosetting thermoplastics, such as cyclic PBT or PET, cementious resins, such as polymer modified cements or gypsums or other matrix systems where impregnation can be achieved to form a mechanical lock with the wire structure.

Further advantageously, the fully encapsulated wire sheet product form can be a thermoplastic resin sheet product where the wires described above are arranged in a single or multi layer format where the thermoplastic resin fully encapsulates and mechanically locks with the individual wires. This layer can be bumpy, flat or a combination thereof. The layer can be made to be glued to other structures or can be intended as a stand-alone flat, or moldable layer. In a preferred embodiment of the invention, resins for a layer of this type are PVC, PET, polyethylene, polypropylene, nylon, acrylic, ABS, Styrene or other like engineering thermoplastics.

The resulting structural reinforcing layer according to the teachings of the present invention can be applied to a load bearing structure to provide a large strength and stiffness critical structure where economic considerations are important. Examples of such load bearing structures are wind blades, boat hulls and decks, bridge decks, high pressure spool-able pipe, reinforced truck floors, pilings, fenders, docks, reinforced wood beams, retrofitted concrete structures, reinforced extrusions or injection moldings or other like structural parts.

Comparing the use of filled or high viscosity resin systems, steel wire reinforcement makes entirely new material combinations possible. In the case of fiberglass or carbon fiber, high viscosity or highly filled resin systems cannot be used, as the fine diameter of the fiber makes impregnation by these systems impossible. Therefore, carbon and glass fiber uses have been limited to low viscosity or unfilled systems. This is particularly limiting in the field of thermoplastics, where in general, resin viscosities are quite high. The use of wire reinforcement in rigid high viscosity thermoset, thermoplastic and cementious matrix systems, allows these high viscosity materials to be reinforced for the first time with continuous reinforcement on a micro scale that makes for efficient material usage and efficient structural load transfer. Examples where the use of wire would be unique would be the use of paste like, highly filled thermoset resins, high viscosity thermoplastics, such as nylon, PVC, ABS, polypropylene, polyethylene, or other engineering thermoplastic, and very high viscosity thin set, polymer modified cementious matrix systems. Another example would be where wire reinforcement is placed directly in wood (chip or fiber) filled thermoset resins or thermoplastics to add a high level reinforcement to plastic, wood or chip board products. Such an application would be impossible with any other reinforcement geometry due to the high viscosities and need to effectively shear load from the high modulus wire structure to the lower modulus, yet rigid, wood filled matrix.

Additionally, regarding the use of cementious matrix systems, the wire geometry is critical to providing a mechanical lock to the matrix of these relatively low adhesion systems.

Further, the use of steel wire makes possible the manufacture of fireproof structures and retrofits. Currently, glass and carbon fiber composites are used to retrofit aging concrete, wood and steel structures. These composite materials are attractive since they are easily moldable in the field and provide the necessary reinforcement. Sheet steel is also used for this purpose, but its relative low strength and non-moldable rigid nature make it difficult to apply or structurally unsuited for the application. The current composite technology has the drawback of high material costs and issues with performance in a fire. In a fire, traditional composites become soft and do not function in the intended structural role. Uniquely, steel wire reinforced cementious composites offer very high strength (like carbon) and stiffness (like steel), but with the added benefit of simple field mold-ability and fire hardness. The invention, particularly when used in the knitted embodiment described herein, provides effective field mold-ability, excellent structural properties, superior cost effectiveness, ability to be used with high viscosity cementious resin systems and the resulting benefit of fire hardness. Additionally, steel wire in the preferred knitted format can be bent on standard sheet metal equipment to perform angles in the material that can be used to provide additional anchorage in structures being retrofitted. Where epoxy like strength and environmental resistance is required in a retrofit, the knitted wire structure can be used as a one to one replacement for carbon or glass reinforcement at a lower cost. Additionally the conductivity of the steel reinforcement can be put to use for electrical, lightening strike or galvanic protection uses.

In a preferred embodiment, and as mentioned above, the structural wire layer is best used as a fully encapsulated sheet product, where the wires are encapsulated and mechanically locked in to a thermoplastic or thermoset layer. This embodiment can take on the form of a bumpy sheet, on one or both sides, if the thermoplastic is relatively thin, or the sheet can be completely flat on both sides, containing the wire within. In all cases, the single layer composite sheet product can be used for a variety of structural end uses. One embodiment uses this type of sheet glued to the bottom of a truck floor for added strength and stiffness. Similarly, a sheet of this type can be attached to under-designed structures of all types with adhesives or mechanical fasteners to upgrade the structure. The fully encapsulated wire structure can be slit into small width tapes and the resulting material can be braided into spool-able high-pressure pipe, or the material can be continuously welded together into a multitude of wire reinforced thermoplastic structures.

As a further example of a structure where the wires are directly incorporated into a structure, an extrusion or pultrusion process would allow the wires to be directly placed into a structural part, using either a thermoset, thermoplastic or cementious matrix resin. The resulting continuous part would have superior properties to parts made without the reinforcement of the wire.

The structures that result from the use of the wire-reinforced layers are of superior mechanical strength, stiffness and are lower in cost to build. A perfect example of an application of the wire layer would be where a wind power blade has been molded using the material. Typical large-scale blades are up to 150 ft long. When used on "upwind" wind power machines, the blades are designed to a specific stiffness to ensure that the blades do not deflect to the point where they could contact the support tower. In this application, internal to the blades, there is a primary spar section that provides the rigidity necessary for these design criteria. Due to the complex curvatures involved and the strength to weight parameters, blades of this type are typically molded from high performance composite materials made form fiber reinforcements and resin. Specific to the spar mentioned above, the glass fiber composite located at the root of the spar caps is approximately 1.5" thick (or approximately 3.1 cm) to provide the necessary stiffness for the blade structure. If steel wire reinforced composite material is substituted for glass fiber in this application, the resulting composite would only need to be 0.3" thick (or approximately 0.76 cm) to provide the necessary stiffness. The novel material would not only save material cost, considering both the reinforcement and the matrix, but the resulting structure would also be lighter, more fatigue resistant, and faster to build, due to the reduced number of layers necessary for the construction. Additionally, since the section thickness is greatly reduced, adverse curing stress from resin exotherms can be eliminated since these exotherms are essentially eliminated. Further, faster cure speeds can be initiated due to the thinner cross section and reduced lay up time, and low cost bulk fillers can be added to the resin (due to eased wet out of the gross macrostructure of the wire), further reducing cost, weight and resin exotherms. Additionally, if the vacuum assisted resin transfer molding technique is used to mold the blades, the wire reinforcing layer would act as the resin distribution layer, eliminating the need for a disposable resin transfer layer and the associated costs that are incurred as a result.

Overall, the use of the wire reinforced layer, specifically steel wire reinforcement, would greatly affect the weight, material cost, processing speed and mold turn over rate for the production of the wind blade example. Similar results would be seen in other larger scale structures, especially those that are designed to a stiffness specification where the novel wire-reinforcing layer is molded in or applied to the surface. Other examples of these type of structures are composite rail cars, pilings, marine fender panels, composite bridge decks, boat hulls and decks, ship structures, building components and other like structures.

A truck floor is an excellent example of the superior performance of the wire-reinforcing layer. After completing extensive testing on composite reinforced truck flooring, it was shown that floor sections reinforced with the novel wire reinforced layer were superior in strength, stiffness, and economics to all other reinforcing techniques. The key to the success of floors made with the wire-reinforced layer were both the low cost of the constituent materials and the high stiffness of the steel wire utilized for the reinforcement. Generally, when reinforcing wood Structures, it is important to use reinforcing materials that are of the highest stiffness. When this approach is taken, structural load can be conducted away from the weaker wood material and deflections can be limited. The resulting composite is superior, as the wood tends to perform best loaded in pure shear, while the wire reinforcing layer performs best when loaded in pure tension on the bottom face of the structural beam. A large mismatch in tensile modulus between the wood and the wire reinforcement facilitates this optimal interaction, and the greatest performance from the materials is realized. Additionally, since the wire reinforced layer is unidirectional, unless specifically constructed to be otherwise, very specific structural behavior can utilized. In the case of the truck floor, the floor can be greatly enhanced to resist bending in the wood grain direction, but the since the wire reinforcing layer has greatly reduced stiffness in the transverse direction, natural wood swelling stress can be accommodated. The result is a very strong truck floor that will not cup or bow across the grain due to unnecessary restriction of natural and unstoppable moisture swelling stresses.

FIG. 1 when compared to the clear epoxy truck floor pictures show the extreme versatility of the cord reinforced product. Even though the two matrix materials shown are radically different in viscosity, both resulting products perform equally well. Thermoset or thermoplastic process can be used with great success, and either can be picked to optimize production speed and cost.

FIG. 1 shows a cross-sectional view of a truck floor reinforced with a structural reinforcing layer according to a preferred embodiment of the invention. The truck floor 1 is made from a plurality of sticks formed end-to-end and side-by-side to form a plank 3. Each plank is connected to each other, preferably through a ship lap joint 5 to make a floor.

The structural reinforcing layer 10 includes twisted wire 11 glued to the bottom of the floor (it will be appreciated that it could also be the top, side, etc.). The wire 11 is covered by a PVC plastic layer 13. In a preferred embodiment, the plastic 13 and glue preferably extend into the ship lap joint to provide complete floor protection.

A similar result was seen when the wire reinforced material according to the present invention was applied to the repair and upgrade of concrete structures. In simplest terms, the knitted wire-reinforcing layer can be substituted for glass or carbon fiber composite retrofits at a greatly reduced cost per square foot. Additionally, since the modulus of the steel wire used in the wire reinforced tape product matches the modulus of the original steel reinforcement, structural upgrades are easier to predict and better take advantage of the reinforcement already in the structures. If cementious matrix systems are used, the retrofitted structure can function even when subjected to the high temperatures of a fire event. In contrast, traditional composite retrofits become soft and ineffective in the high temperatures of a fire. Also in contrast, traditional rebar based retrofits require the use of thick concrete overlays, in excess of 2 inches (approximately 5.08 cm), while the use of wire reinforced retrofits only require ⅛" (approximately 0.3175 cm) of cover for adequate shear transfer of load.

In a composite format where the wire structure is highly loaded, ultra high strength steel is required and is available only when manufactured in very fine steel wire. Anytime a high modulus material is used with lower modulus material, the high modulus material attracts load at a rate proportionate to the ratio of the modulus of the materials. Since steel tends to have a very high modulus as compared to materials it may be mixed with (such as glass fiber composite), the steel used must be of exceptional strength or premature failure will occur due to the loading of the steel. However, if the steel wire is used in a non twisted, single strand mono filament format, a sufficient load can not be sheared into the filaments to reach the full filament breaking load. Therefore failure will occur greatly below theoretical limits due to shear failure in the matrix. This is true with high adhesion thermoset or thermoplastic systems and is especially true with low adhesion cementious materials. In contrast, in the twisted wire format, the full tensile capacity of the filaments can be reached in a relatively short development length and 99.9% of the material's tensile modulus can be realized. Extensive testing in truck floor test specimens, summarized in FIG. 14 showed that both the added strength of the fine diameter wire and the high shear load transfer of the twisted wire played a significant role in the resulting structural performance of the floor specimen. Likewise, similar results were obtained in pure composite formats, steel-glass fiber hybrids, reinforced thermoplastics and cementious systems.

Although the present invention has been explained hereinabove by way of a preferred embodiment thereof, it should be pointed out that any modifications to this preferred embodiment within the scope of the appended claims is not deemed to alter or change the nature and scope of the present invention. One such alternative embodiment would be where the wires are arranged at random as either continuous spirals or cut lengths. The resulting wire sheet would still possess all the benefits described herein, but these benefits would be translated in all directions as opposed to the unidirectional properties described at length in this document.

Additionally, the application has explained the use of the material within the scope of several composite process and applications. However, these applications in no way limit the application of the present invention to these specific process or products. The invention is broadly applicable to other composite, plastic and cementious processes such as SMC, BMC molding, RIM molding, centrifugal casting, spray molding and other various process not previously mentioned in the explanation of the invention's principles and claims. As well, there are numerous unmentioned products where the invention will have a significant impact. Although several specific products are named, it is not the intent to limit the applicability of the invention only to these specific end uses.

What is claimed is:

1. In combination, a load bearing structure and a structural reinforcing layer comprising a wire cord layer arranged to create a twisted wire geometry comprising individual wires having a circular cross section, wherein multiple wires are twisted together continuously along their length, forming a wire cord structure having a line of continuous or intermittent contact with adjacent wires that extend along the length of the resulting wire cord structure, said twisted wire geometry being made of a plurality of said wires, that, when twisted about themselves, mechanically interlock into a structural matrix material, said structural reinforcing layer being attached to or molded into said load bearing structure, wherein said load bearing structure is a wind blade, a boat, a ship, a bridge, a bridge deck, a faring, a tunnel liner, a column, a beam, a building component, a roof, a deck, a floor, a wall, a balcony, a riser, a platform module, a sub-sea molded structure, a piling, a dock, a fender, a container, a truck body, a pipe, or a pressure vessel.

2. The combination of claim 1, wherein said structural reinforcing layer is glued to said load bearing structure.

3. The combination of claim 2, wherein said glue is selected from the group consisting of epoxy, urethane, acrylic, hot melt, polyester, vinyl ester, reactive hot melt, or other thermo-set or thermoplastic adhesives, the thermo-set or thermoplastic adhesives possessing low application viscosity, high adhesion to wood substrate, fast processing times, and long-term moisture resistance.

4. In combination, a load bearing structure and a structural reinforcing layer comprising a wire layer arranged to create a twisted wire geometry mechanically interlocked into a structural matrix material, said structural reinforcing layer being attached to or molded into said load bearing structure, wherein said load bearing structure is a wooden building beam or a telephone pole.

5. In combination, a load bearing structure and a structural reinforcing layer comprising a wire layer arranged to create a twisted wire geometry mechanically interlocked into a structural matrix material, said structural reinforcing layer being attached to or molded into said load bearing structure, wherein said load bearing structure is a truck floor.

6. The combination of claim 5, wherein the structural reinforcing layer is glued to a bottom surface of said truck floor.

7. In combination, a load bearing structure and a structural reinforcing layer comprising a wire cord layer arranged to create a twisted wire geometry comprising individual wires having a circular cross section, wherein multiple wires are twisted together continuously along their length, forming a wire cord structure having a line of continuous or intermittent contact with adjacent wires that extend along the length of the resulting wire cord structure, said twisted wire geometry being made of a plurality of said wires, that, when twisted about themselves, mechanically interlock into a structural matrix material, said structural reinforcing layer being attached to or molded into said load bearing structure, wherein said load-bearing structure is extruded or pultruded.

8. In combination, a load bearing structure and a structural reinforcing layer comprising a wire layer arranged to create a twisted wire geometry mechanically interlocked into a structural matrix material, said structural reinforcing layer being attached to or molded into said load bearing structure, wherein said structural reinforcing layer is glued to said load bearing structure; and wherein said load bearing structure is a wind blade, a boat, a ship, a bridge, a bridge deck, a faring, a tunnel liner, a column, a beam, a building component, a roof, a deck, a floor, a wall, a balcony, a riser, a platform module, a sub-sea molded structure, a piling, a dock, a fender, a container, a truck body, a pipe, or a pressure vessel.

9. The combination of claim 8, wherein said glue is selected from the group consisting of epoxy, urethane, acrylic, hot melt, polyester, vinyl ester, reactive hot melt, or other thermo-set or thermoplastic adhesives, the thermo-set or thermoplastic adhesives possessing low application viscosity, high adhesion to wood substrate, fast processing times, and long-term moisture resistance.

* * * * *